May 6, 1924.

Z. A. BRUEGGER

ENGINE PISTON

Original Filed Feb. 2, 1920

WITNESSES

INVENTOR
Z. A. BRUEGGER,

BY

ATTORNEYS

May 6, 1924.

Z. A. BRUEGGER

ENGINE PISTON

Original Filed Feb. 2, 1920

WITNESSES

INVENTOR
Z. A. BRUEGGER,
BY
ATTORNEYS

Patented May 6, 1924.

1,492,917

UNITED STATES PATENT OFFICE.

ZENO ARNO BRUEGGER, OF BOISE, IDAHO.

ENGINE PISTON.

Original application filed February 2, 1920, Serial No. 355,891. Divided and this application filed September 20, 1921. Serial No. 501,926.

*To all whom it may concern:*

Be it known that I, ZENO ARNO BRUEGGER, a citizen of the United States, and a resident of Boise, in the county of Ada and State of Idaho, have invented certain new and useful Improvements in Engine Pistons, of which the following is a specification.

My invention relates to engine pistons and particularly to means carried thereby for insuring the efficient lubrication of that side of a cylinder which receives the greatest amount of piston thrusts, the invention being an improvement upon the arrangement for a similar purpose shown in my Patent 1,395,794, dated November 1, 1921.

A purpose of my present invention is the provision of a tubular member or pipe made in the form of a ring and formed integral with or seperately from an engine piston, and so arranged within the piston as to trap a portion of the oil projected into the piston in a splash system and to deliver this oil to the outer side of the piston between the contacting walls of the cylinder and piston and at that point where the thrust of the piston is the greatest.

It is also a purpose of my invention to provide a piston which is provided exteriorly thereof with an annular oil channel that is inclined in the direction of the point where the thrust of the piston is the greatest, and to which oil from a point interiorly of the piston is conducted through ducts formed in the wall of the piston at the highest point of the channel.

I will describe four forms of engine pistons embodying my invention and will then point out the novel features thereof in claims.

Figure 1:
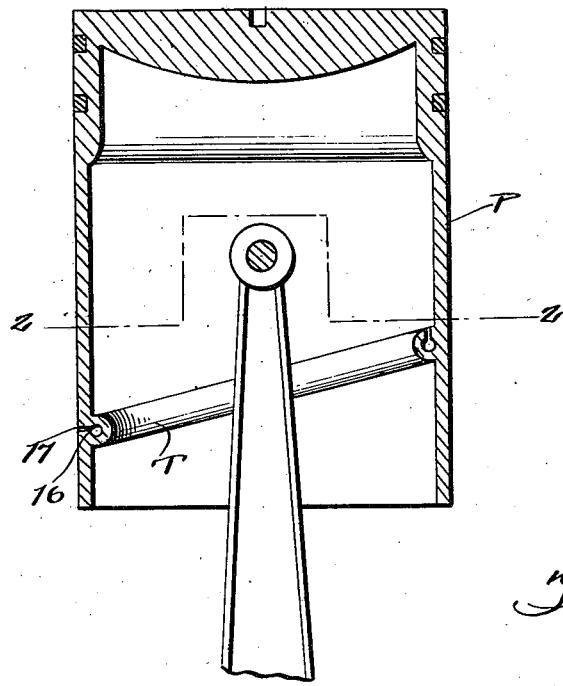
Figure 1 is a view showing in vertical section one form of piston embodying my invention.
Figure 2:
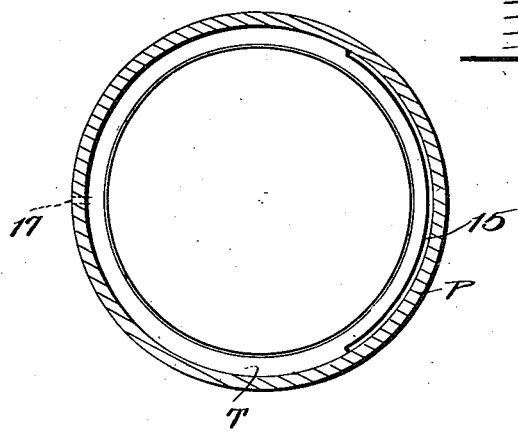
Figure 2 is a transverse sectional view taken on the line 2—2 of Figure 1.

Referring specifically to the drawings, in which similar reference characters refer to similar parts, and particularly to Figure 1, P designates a piston of the ordinary construction with the exception that it is provided interiorly thereof with a tubular member or pipe T that extends circumferentially thereof and is inclined downwardly to a point adjacent the lower end of the piston. The member T at its highest point is provided at its upper side with a slot 15 which as clearly shown in Figure 2 extends for a minor portion of the circumference of the member. The lowest point of the member T is formed at its periphery with a discharge port 16 that communicates with an outlet port 17 formed in the piston P.

The member T as shown in Figure 1 is cast integral with the piston P, and the arrangement of the member is such that the ports 16 and 17 are disposed at that point upon the piston which receives the greatest amount of thrust.

In the normal operation of an engine employing the splash system of lubrication, the oil is thrown upwardly into the piston and cylinder for lubricating the contacting walls of the two elements. As the oil descends along the inner wall of the piston, a portion thereof passes into the member T through the slot 15, and because of the inclination of the member, this oil gravitates to the lower portion of the member through the port 16 and finally through the port 17 to the contacting walls of the cylinder and piston. In this manner, the oil is delivered to that side of the piston which receives the greatest amount of thrust, so that it is thoroughly lubricated at all times to prevent uneven wear at this point thus causing the piston at all times to properly fit within the cylinder so as to secure high compression and prevent carbonization.

Figure 3:
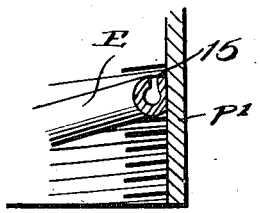
Figure 3 is a fragmentary sectional view of another form of piston embodying my invention.

In Figure 3 I have shown a piston P' provided with a pipe E arranged in the same manner as the member T and likewise provided with a slot 15 and a discharge port 16 which communicates with the outlet port 17 of the piston. In this form of my invention, the pipe E is made separately from the piston P' and is adapted to be secured in inclined position within the piston either by rivets, brazing, soldering, welding, bolts or the like or by threadedly fitting the same within the piston in the manner shown in Figure 3. This arrangement allows of the ready removal of the pipe to permit cleaning of the same should it become clogged so as to prevent the proper circulation of oil therethrough.

Figure 4:
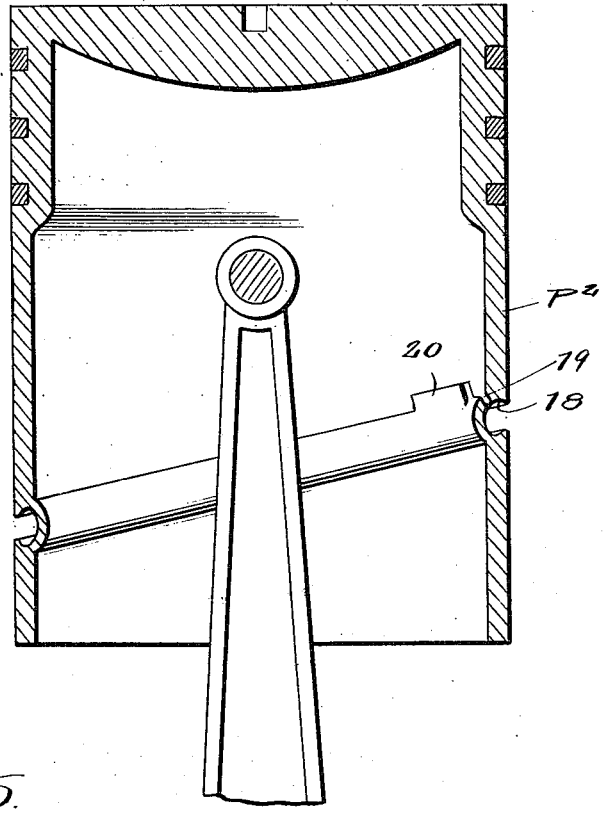
Figure 4 is a sectional view of another form of piston embodying my invention.

Referring now to Figure 4 I have shown another form of piston designated at P², and which is formed exteriorly thereof with an annular channel 18 arranged in the same manner as the pipe P so that oil will gravitate to that point upon the piston at which the greatest thrust is exerted. Oil from a point interiorly of the piston is adapted to be supplied to the channel through one or more ducts 19 formed in the wall of the piston at the highest point of the channel. The oil traversing the inner wall of the piston is directed to these ducts by means of a flange 20 extending inwardly from the wall of the piston and for a short distance circumferentially of the piston.

Figure 5:
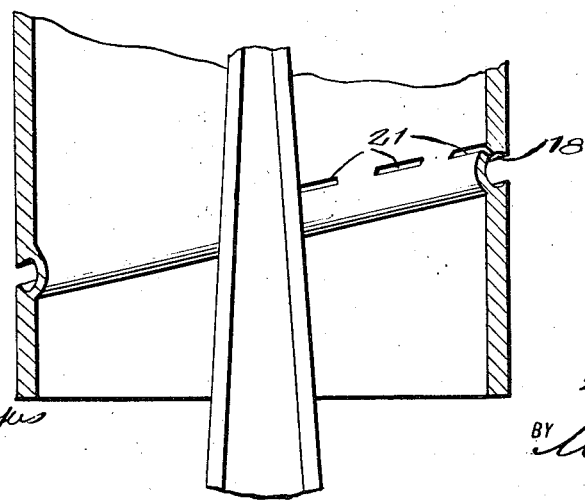
Figure 5 is a view similar to Figure 3 showing a modified construction of the piston shown in Figure 4.

In Figure 5 I have shown the wall of the piston provided with a plurality of slots 21 arranged one beside the other and inclined in the direction of the channel so that the oil moving downwardly of the inner wall of the piston will pass into such slots and ultimately into the channel.

Although I have herein shown and described only four forms of piston embodying my invention, it is to be understood that various changes and modifications may be made herein without departing from the spirit of the invention or the spirit and scope of the appended claims.

What I claim is:

1. A cylinder piston formed exteriorly thereof with an annular inclined channel, ducts formed in the wall of the piston for effecting communication between the inner side of the piston and said channel, said ducts being arranged to conduct the oil traversing the inner wall of the piston into the channel at the highest point of the latter, and a flange formed interiorly of the piston for directing the oil into said ducts.

2. A cylinder piston formed exteriorly thereof with an annular inclined channel, and having a slot formed in the wall of the piston and communicating between the interior thereof and said channel to conduct oil from the inner side of the piston into the channel at the highest point of the latter.

3. A cylinder piston having an annular inclined channel within its external surface, opening exteriorly and entirely therearound, and having at its highest point a port communicating with the interior of the piston which opens upwardly adjacent to the inner surface of the piston.

4. A cylinder piston having an inner annular rib inclined therein and provided with a continuous channel opening exteriorly of the piston entirely around the latter, said rib having an upwardly opening slot at its highest point adjacent to the inner surface of the piston and communicating between the said channel and the interior of the piston.

5. A cylinder piston having an inner annular rib inclined therein and provided with a continuous channel opening exteriorly of the piston entirely around the latter, said rib having an upwardly opening slot at its highest point adjacent to the inner surface of the piston and communicating between the said channel and the interior of the piston, and a guide flange upstanding from the said rib along the inner side of said slot.

ZENO ARNO BRUEGGER.